United States Patent

[11] 3,594,085

[72] Inventor Ingo Goetz Wilmanns
La Celle Saint Cloud, France
[21] Appl. No. 755,965
[22] Filed Aug. 28, 1968
[45] Patented July 20, 1971
[73] Assignee Centre National De La Recherche Scientifique
Paris, France
[32] Priority Aug. 31, 1967, Mar. 22, 1968
[33] France
[31] 119,567 and 145,044

[54] ELLIPSOMETRIC METHOD AND DEVICE
6 Claims, 3 Drawing Figs.
[52] U.S. Cl. .................................................. 356/114,
250/225, 350/150, 350/152, 356/118
[51] Int. Cl. ............................................. G01b 11/26,
G02f 1/18
[50] Field of Search............................................ 356/33-
—35, 114—119; 350/150, 151, 152; 250/225

[56] References Cited
UNITED STATES PATENTS
2,976,764 3/1961 Hyde et al..................... 356/116
3,031,919 5/1962 Collyer ........................... 356/115
3,060,793 10/1962 Wells............................. 356/118
3,087,377 4/1963 Daley............................. 356/115
3,230,820 1/1966 Wisnieff........................ 356/117
3,438,712 4/1969 Meltzer......................... 356/117

OTHER REFERENCES
Takasaki, H., " Journal of the Optical Society of America," Vol. 51, April 1961, pp. 462— 3.

Primary Examiner—Ronald L. Wibert
Assistant Examiner—J. Rothenberg
Attorney—Smythe & Moore ABSTRACT: An ellipsometric device and method for applying a phase modulation and a polarization direction modulation to a beam of light at two different frequencies and using a polarized parallel monochromatic light beam, a polarization modulator, a phase modulator, and means to angularly displace with respect to each other, an assembly having on one hand a beam polarizer phase and azimuth modulator and on the other hand the sample, an equalizer, analyzer and photoreceiver.

PATENTED JUL20 1971 3,594,085

INVENTOR
INGO GOETZ WILMANNS
ATTORNEYS
Smythe & Moore

ELLIPSOMETRIC METHOD AND DEVICE

This invention relates to improvements in automatic ellipsometry; it relates more particularly to a device for simultaneous differentiation of the two error signals of an ellipsometer. These error signals, after servocontrol, allow the ellipsometer to be made automatic.

It is known that a linearly polarized light vibration may be decomposed into two perpendicular vibrations that are in phase. One of these vibrations is in the incidence plane, and the other is normal to this plane. After reflection or transmission, each of the vibrations undergoes amplitude and phase changes which are generally different. The light is then elliptically polarized. The ellipsometer makes it possible to measure such changes in states of polarization.

In order to define an ellipse, two different quantities must be defined, for example, the phase and the azimuth of the ellipse. In known methods of ellipsometry, a linearly polarized parallel monochromatic light beam is employed. This light, which is reflected or transmitted by the sample, consisting of a material with a reflecting or transparent surface, passes through a phase equalizer and then impinges on an analyzer. The analyzer, identical to the polarizer, makes it possible to detect, through extinction, the presence of linearly polarized light and to measure the polarization azimut at $\pm(x/2)$ of the direction of extinction, thus giving the ratio of the two axes of the ellipse. By placing a photoreceiver after the analyzer, it is possible to measure the degree of extinction, so that by successively adjusting the equalizer and the analyzer, it is possible to obtain the phase and azimuth of the elliptical vibration, indicated by complete extinction of the beam. It is therefore possible to rotate the analyzer and alternately adjust the equalizer so as to obtain a minimum of light on the measuring instrument. However, a precise indication of the meaning to be given to the modification and achievement of the minimum, is not obtained in this manner.

To remedy this difficulty, it has already been suggested to introduce phase or polarization direction modulation, but this method still leaves the unmodulated quantity imperfectly defined. It has also been suggested to use two phase or azimuth modulators of the same type respectively, in order to obtain the error signals and thus improve the accuracy of the measurements, but the practical results were not satisfactory, as could be expected.

The improvements in ellipsometry according to this invention consist fundamentally in simultaneously applying at two different frequencies, two modulations, one to the phase and the other to the direction of polarization. The presence of these two modulations gives rise to two components in the photocurrent from the photoreceiver, i.e., a component at the modulation frequency of polarization and another component at the frequency of phase modulation.

In accordance with the invention, polarization modulation may be provided by any appropriate means, for example, by using a Faraday effect modulation or by causing the polarizer to oscillate around a resting position.

Phase modulation may be obtained using a KERR cell, a POCKELS cell, by mechanical vibration of the equalizer or by double refraction through a piezoelectric effect.

The invention further relates to an apparatus for applying the above-mentioned improvements. Such an ellipsometer comprising means for providing a monochromatic parallel beam, a polarizer, a phase equalizer, an analyzer, a photoreceiver as well as a sample in the path of the beam, essentially includes, according to this invention, in the path of the linearly polarized parallel beam, a polarization modulator and a phase modulator, means for angularly displacing, with respect to one another, on the one hand, the assembly comprising the beam-polarizer, phase and azimuth modulators, on the other hand, the sample under examination, and, finally, the equalizer, analyzer and photoreceiver; the photoreceiver may be a photomultiplier for the range of visible and ultraviolet radiations; this will be a photodiode for near infrared radiations.

The means providing the parallel monochromatic beam advantageously comprise, in the known manner, a light source, a collimator and an interference filter. The polarizer and analyzer may be of any known type providing linearly polarized light.

The polarization modulator may be placed between the polarizer and the sample; the phase modulator may be mounted between the polarization modulator and the sample but, like the polarization modulator, it may be placed in any position between the polarizer and analyzer.

In the case in which polarization modulation is obtained through a Faraday effect, the modulator may be a transparent cylinder, advantageously made of melted silica so as to allow the use of the spectrum from the ultraviolet down to infrared, mounted along the axis of a coil fed with an alternating current of appropriate intensity and frequency.

As far as phase modulation is concerned, a cube of melted silica may be employed, mounted between two piezoceramic plates placed between the cube and two steel cylinders; an alternating voltage is applied to the two plates, at the resonance frequency of this mechanical system and cube of melted silica is thus periodically compressed and becomes birefringent through compression, i.e., the velocity of light propagation is a function of the direction of polarization in the birefringent material: a periodic phase shift, therefore, occurs which gives the phase modulation.

Each of the modulators is provided with a low frequency generator and a synchronous rectifier for the detection of a corresponding signal, the generator assigned to the polarization modulator providing the necessary current to a coil and a signal actuating the synchronous rectifier for the detection of the polarization modulation signal. The second generator, assigned to the phase modulator, provides the excitation voltage of said modulator and also actuation signal for the synchronous rectifier for the detection of the phase modulation signal.

At least one motor is provided to ensure any relative displacements of various assemblies mentioned above.

Finally, a preamplifier may be provided between the photoreceiver and each synchronous rectifier, for the case in which the signal contained in the photocurrent is weak. Of course, when the signal/noise ratio is bad, it is possible, in the known manner, to integrate the signal leaving the synchronous rectifier, so as to ensure the elimination of the noise.

An ellipsometer according to the invention, may, in one embodiment, comprise means for providing a parallel monochromatic beam, a polarizer, a phase equalizer, an analyzer, a photoreceiver as well as a reflecting surface in the path of the beam, this ellipsometer including in the path of the linearly polarized parallel beam, a polarization modulator and a phase modulator, means for angularly displacing, with respect to one another on the one hand, the assembly comprising beampolarizer, phase and azimuth modulators, on the other hand, the reflecting surface and finally the equalizer, analyzer and photoreceiver.

When, in this last device, a birefringent strip, whose phase shift is equal to $n \lambda/2$ of the wave length to be observed, is placed in the optical path of the ellipsometer and in place of the equalizing strip, it is noted that this strip allows linearly polarized light to pass without any change in its state of polarization. If the wavelength is then progressively changed, an elliptical polarization is first obtained. For each multiple ($n \lambda/2$ given by the phase shift of the birefringent strip, a linear polarization is obtained. Any phase modulator makes it possible to locate these states of linear polarization, and a detecting assembly, preferably a synchronous rectifier mounted after a photoreceiver, makes it possible to locate the zero crossings of the signal on the modulation frequency. In general, this system of detection of zero crossing consists of a synchronous rectifier. The varying embodiment considered in the last case, consists, therefore, of a device comprising a polarizer, a phase modulator, a birefringent strip (for example made of quartz, mica, or represented by a Babinet-Soleil equalizer), a second polarizer, a photodetector followed by an amplifier, and a synchronous rectifier. The order of succession of the phase modulator and birefringent strip does not affect the operation of the device, as has already been indicated with respect to the most general embodiment of the invention.

Described below are various embodiments of an improved automatic ellipsometry device according to the invention, with reference to the appended drawings.

Figure 1:
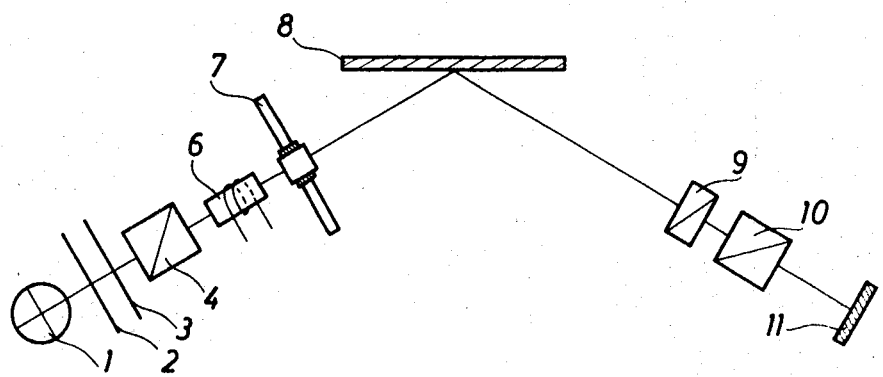
FIG. 1 is a schematic view of the device with a reflecting sample.

In the drawing can be seen a polychromatic light source 1 successively illuminating a collimator tube designed to make the beam parallel and an interference filter 3 providing monochromatic light. After passing through polarizer 4, the monochromatic parallel beam is transformed into a linearly polarized parallel beam. Along the axis of the beam, are mounted in succession, in the example shown, a polarization modulator 6 and a phase modulator 7 which will be described in detail hereinafter, a sample 8 inclined to the beam, and then in the path of the beam, a phase equalizer 9, an analyzer 10 and a photoreceiver 11.

It is quite evident that, if the sample is transparent, the incident beam passes through said sample and leaves it in prolongation of the beam.

Figure 2:
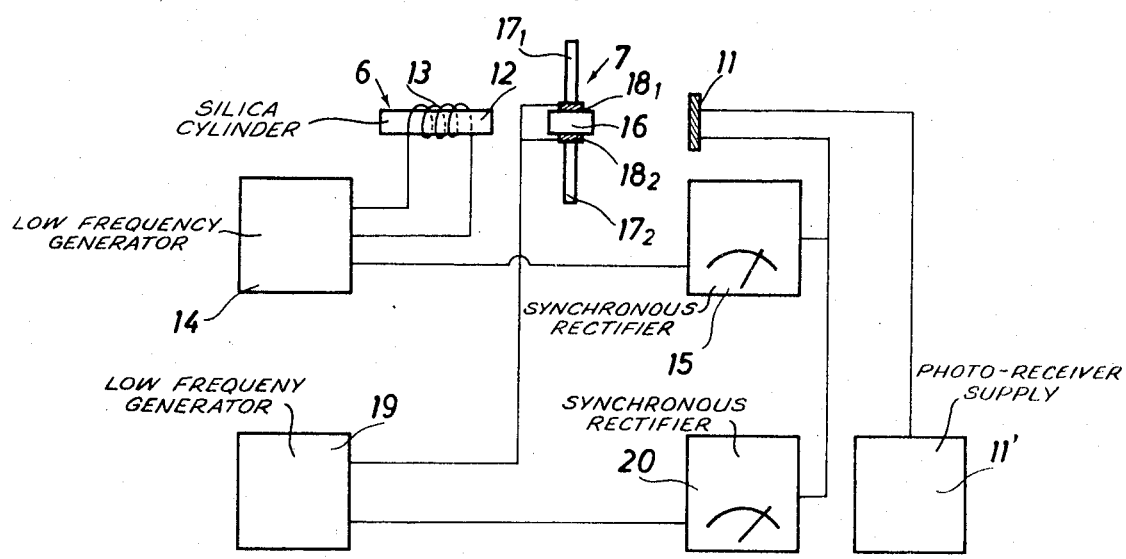
FIG. 2 shows schematically the electronic part of the device.

FIG. 2 shows that the polarization modulator 6 comprises a melted silica cylinder 12 surrounded by a coil 13 fed by a low frequency generator 14 connected further to a synchronous rectifier 15 which moreover is connected to photoreceiver 11. Phase modulator 7 consists of a melted silica cube 16 mounted between two coaxial metallic cylinders 17, and 17$_2$, perpendicularly to the axis of the beam; between each of the two opposite faces of the cube parallel to this axis and the neighboring cylinder is placed a strip 18$_1$ and 18$_2$ made of piezoceramic material. The strips 18$_1$ and 18$_2$ are connected to the low frequency generator 19 which is further connected to the synchronous rectifier 20, itself connected to photoreceiver 11 suitably fed by 11′.

In a practical example:

modulator 6 comprised a melted silica cylinder 12, 20 mm. in diameter and 90 mm. in length; surrounded by a coil 13 having 900 turns, receiving from the generator 14 an alternating current of 2 amperes and a frequency of 930 Hz., modulator 7 comprised two steel cylinders 17$_1$ and 17$_2$ 15 mm. in diameter and 40 mm. in length. Strips 18$_1$ and 18$_2$ were made of a piezoceramic material having a length of Φ 16 mm. and a thickness of 3 mm., the melted silica cube had a 20 mm. side. Generator 19 provided to the strips 18$_1$, 18$_2$ an alternating voltage of approximately 20 v. at a frequency of 20 kHz. (resonance frequency of the mechanical system consisting of the cylinders, cube, plates).

Figure 3:
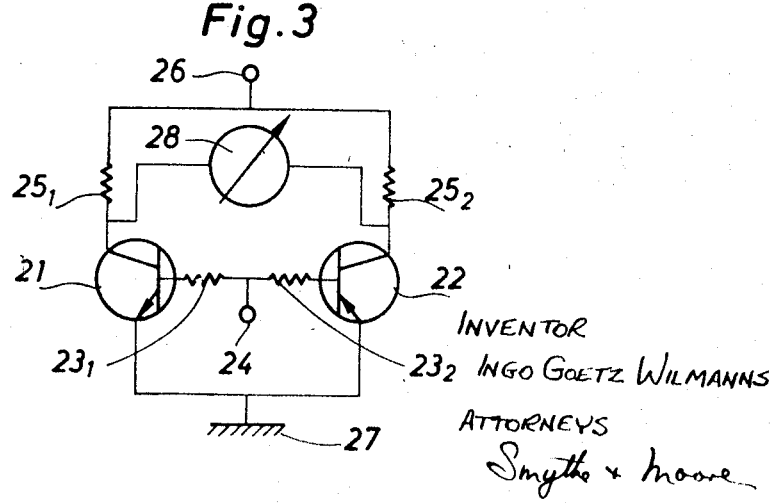
FIG. 3 shows a type of synchronous rectifier.

The synchronous rectifier 20 of FIG. 3 comprises, for example, two transistors 21, 22 respectively PNP and NPN; the bases are connected through two equal resistors 23$_1$ and 23$_2$ (2.2 k. Ω, in this case); the midpoint of the two resistors acts as a lead-in 24 for the reference signal. Transistors 21 and 22 are connected on one side by two other resistors 25$_1$ and 25$_2$ whose midpoint acts as a lead-in 26 for the photocurrent signal and on the other side are grounded at 27. A microammeter 28 may be connected between resistors (10 k. Ω, in this case) 25$_1$ and 25$_2$. Transistor PNP acts as a closed switch when a negative signal is applied to its base; transistor NPN acts as an open switch when a negative signal is applied to its base; microammeter 28 may be replaced by a servomotor system which automatically adjusts the position of the equalizer or analyzer.

From the point of view of practical construction, the ellipsometer according to the invention may be mounted on a goniometer. The stationary arm carries the light source, the collimator, the interference filter, the polarizer, the phase modulator and azimuth modulator, and the sample is placed on the central rotating stage. The movable arm is driven into rotation by a motor so as to modify the angles of incidence of the beam; this arm, therefore, rotates with respect to the fixed arm and causes the rotation, for example, by means of gears, of the stage at an angular velocity which is half its own. On the movable arm are mounted the equalizer, analyzer and photoreceiver. The electronic assembly, comprising the two low frequency generators, the two synchronous rectifiers, the feeding mechanism for the photoreceiver and eventually, a photocurrent preamplifier, is located in a separate box. After setting the beam into operation, the sample is placed on the central stage, the incidence angle is adjusted and the analyzer and equalizer are rotated simultaneously in the direction indicated by the error signals leaving the synchronous rectifiers. It is possible to use this adjustment to actuate a servomotor. It is of course possible, in addition to the measurement of the polarization modulation frequency, component and phase modulation frequency component, to measure the proportional continuous component at the level of the light passing through the analyzer. It then becomes possible to determine the three parameters defining the absolute ellipse, i.e. to exactly define the characteristics, for example, of a thin superficial layer.

I claim:

1. In an ellipsometric measuring method using linearly polarized parallel monochromatic light, with phase and azimuth modulation, the improvements consisting in simultaneously applying at two different frequencies a phase modulation and a polarization direction modulation to the polarized light.

2. An ellipsometer for simultaneously applying at two different frequencies, a phase modulation and a polarization direction modulation, the combination including, means for providing a parallel monochromatic beam; a polarizer, a phase equalizer, an analyzer, a photoreceiver, as well as a sample in the path of the beam; in the path of the beam emerging from the polarizer, polarization modulator means operating at one frequency and phase modulator means simultaneously operating at a different frequency; and means for angularly displacing, with respect to one another, on the one hand the assembly consisting of said beam polarizer phase and azimuth modulator means, on the other hand, the sample and finally the equalizer, analyzer and photoreceiver.

3. Ellipsometer according to claim 2 with said polarization modulator means placed between the polarizer and the sample.

4. Ellipsometer according to claim 2 with said phase modulator means placed between the polarization modulator means and the sample.

5. Ellipsometer according to claim 2, with said polarization modulator means comprising a melted silica transparent cylinder, a symmetrical winding, an electric current power supply for this winding, said cylinder being placed along the axis of said winding.

6. Ellipsometer according to claim 2 with said phase modulator means comprising a melted silica tube, two plates made of piezoceramic material, each mounted against one of two parallel faces of the cube, so as to clamp the cube between them, two metallic cylinders clamping said plates and means for applying to the plates, an alternating voltage at the resonance frequency of the mechanical system forming the phase modulator means.

UNITED STATES PATENT OFFICE
CERTIFICATE OF CORRECTION

Patent No. 3,594,085      Dated July 20, 1971

Inventor(s) Ingo Goetz Wilmanns

It is certified that error appears in the above-identified patent and that said Letters Patent are hereby corrected as shown below:

Column 2, line 67, insert a parenthesis ()) after "$\lambda/2$".
Column 3, line 36, "$17_1$ and $17_2$" should be --$17_2$ and $17_1$--;
Column 3, line 52, "$\emptyset$" should be deleted.

Signed and sealed this 25th day of January 1972.

(SEAL)
Attest:

EDWARD M. FLETCHER, JR.
Attesting Officer

ROBERT GOTTSCHALK
Commissioner of Patents